United States Patent [19]

Schuricht

[11] Patent Number: 5,319,631
[45] Date of Patent: Jun. 7, 1994

[54] METHOD FOR MEASURING IN THE SUBSCRIBER AREA OF AN INTEGRATED SERVICES DIGITAL NETWORK SYSTEM

[75] Inventor: Michael Schuricht, Berlin, Fed. Rep. of Germany

[73] Assignee: Siemens Aktiengesellschaft, Munich, Fed. Rep. of Germany

[21] Appl. No.: 2,531

[22] Filed: Jan. 11, 1993

Related U.S. Application Data

[63] Continuation of Ser. No. 497,547, Mar. 22, 1990, abandoned.

[30] Foreign Application Priority Data

Sep. 22, 1988 [DE] Fed. Rep. of Germany ....... 3832491

[51] Int. Cl.$^5$ .............................................. H04J 1/16
[52] U.S. Cl. ......................................... 370/13; 371/27
[58] Field of Search ................. 370/13, 14, 110.1, 17; 375/10; 371/3, 27, 22.1–22.3; 379/5, 6, 23, 24, 30

[56] References Cited

U.S. PATENT DOCUMENTS

| | | | |
|---|---|---|---|
| 4,535,453 | 8/1985 | Rhodes et al. | 370/13 |
| 4,611,320 | 9/1986 | Southard | 370/13 |
| 4,712,209 | 12/1987 | Kuritani et al. | 370/110.1 |
| 4,766,594 | 8/1988 | Ogawa et al. | 379/5 |
| 4,860,332 | 8/1989 | Chism | 379/6 |
| 4,937,464 | 6/1990 | Nanba et al. | 379/5 |
| 4,937,850 | 6/1990 | Borbas et al. | 379/6 |
| 4,961,180 | 10/1990 | Schwarz et al. | 370/13 |
| 4,965,795 | 10/1990 | Coffelt et al. | 370/110.1 |
| 4,989,202 | 1/1991 | Soto et al. | 370/13 |
| 5,023,869 | 6/1991 | Grover et al. | 370/13 |
| 5,189,663 | 2/1993 | Williams | 370/13 |

FOREIGN PATENT DOCUMENTS 3245588 6/1984 Fed. Rep. of Germany.
661629 7/1987 Switzerland.

OTHER PUBLICATIONS

Pp. 94–104, Elektronik, vol. 36; No. 24, Nov. 27, 1987
Dietmar Weber et al., "Moderne Medtechnik Verifiziert K-Anlagen-Leistungsfähigkeit", Medtechnik, vol. 40, Issue 11, pp. 768–771, 1987.

*Primary Examiner*—Douglas W. Olms
*Assistant Examiner*—Dang Ton
*Attorney, Agent, or Firm*—Kenyon & kenyon

[57] ABSTRACT

Between the net termination and the subscriber's data terminals forming the boundary to the subscriber area, procedures peculiar to the interface take place in the form of a two-way transmission and reception of data sequences. The order of the data sequence and the transmit duration of each data sequence is stipulated, which adversely affects the measuring tasks in the subscriber area.

To avoid these adverse effects, a test pattern generator is used that is able to transmit all data sequences required for the procedures in an order and a duration that is desired from a metrological standpoint. Freely definable data sequences can be transmitted by the test pattern generator for measuring purposes. Furthermore, the test pattern generator is able to transmit control and/or identification data synchronously to the data sequences.

7 Claims, 2 Drawing Sheets ized interface, the so-called $S_o$-interface, to which different types of terminal equipment can be connected.

METHOD FOR MEASURING IN THE SUBSCRIBER AREA OF AN INTEGRATED SERVICES DIGITAL NETWORK SYSTEM

This is a continuation of application Ser. No. 07/497,547 filed on Mar. 22, 1990 now abandoned.

BACKGROUND OF THE INVENTION

The present invention relates generally to a method for measuring the subscriber area of an Integrated Services Digital Network (ISDN) system, and more particularly to such a method for measuring how a component of a subscriber area of a standard ISDN system reacts to selected data sequences by disconnecting the subscriber data terminal and/or the net termination from the data bus and connecting a test pattern generator and a measuring device to the data bus.

An ISDN system can be subdivided into a so-called subscriber area and the ISDN user area. The boundary between these two areas is formed by a net termination. A data bus line leads from this net termination through the subscriber's space. The net termination or the data bus is provided with a standardized interface, the so-called $S_o$-interface, to which different types of terminal equipment can be connected. This $S_o$-interface is a four-wire interface for bidirectional data exchange between the net termination and one or several of the subscriber's data terminals. A so-called AMI-NRZ code is used as a transmission code. This is a quasi ternary code, in which the "0" bits are represented with $+0.75$ V or $-0.75$ V and the "1" bits are represented as zero volts; consecutive "0" bit pulses have fundamentally alternating polarity. The data to be transmitted, as well as synchronization and control data, are compressed into transmission frames that are 250 µs long. The beginning of such a transmission frame is characterized by a code violation. The code violation occurs when two consecutive "0" bit pulses have the same polarity. This violation is positively recognized by the data terminal, so that the data terminal is easily and quickly synchronized with the net termination.

Before a data terminal can receive or transmit data, it is necessary to set up an appropriate connection by means of a defined procedure. Thus, besides the already mentioned synchronization of the transmission frames, the transmission channels must be made transparent, in other words they must be prepared for transferring data. This procedure, also designated as activation, consists of the two-way transmission and reception of specific, defined data sequences—in the following also denoted as infos—between the data terminal and the net termination. To this end, these components are provided with special control modules, $S_o$ bus controllers (SBC) and ISDN communication controllers (ICC). The SBC modules control the activation and also the deactivation procedures respectively. This control system is monitored by the internal rate setting of timers; this means that the corresponding infos are always only output for a specific period of time; within this time, a specific info must be transmitted by the corresponding component as a response to a received info. The info to be transmitted as a response from the corresponding component is specifically meant for the info that the component had just received before, so that each procedure is characterized by a defined hierarchy of infos. If the connection set-up (activation), as mentioned above is supposed to start from a data terminal, then this data terminal initially transmits a first data sequence, designated as info 1, to the net termination. In the normal case, this net termination reacts to the reception of the data sequence, info 1, by transmitting a data sequence designated as info 2; this response must take place within a specific time and the transmission of info 2 ensues only for a limited time. During this time, on the other hand, the terminal must react to the reception of info 2 by transmitting a data sequence, info 3, whose reception, in turn, is acknowledged by the net termination by the transmission of a data sequence, info 4. If the info transmitted as a response by the corresponding component does not correspond to the info to be expected in accordance with the hierarchy (for example transmission of info 4 and response to info 1), the expected info is not received within a defined time, or if the procedure is not begun from the subscriber data terminal with info 1, if then the procedure is discontinued and the $S_o$ data bus once again finds itself in its initial state, that is in an inactive state.

This performance characteristic that is necessitated by the SBC or ICC modules (for example according to the West German post office guideline 1 TR3, that includes instructions for measuring on the $S_o$ interface) makes it more difficult to measure on the communication paths and on the $S_o$ interfaces. An info is available for a limited time only—namely for a defined, maximum transmit duration or until the info expected as a response is received, so that only a limited time is available as well to measure the reaction of the corresponding component. Furthermore, in the case of the measurements, one is bound to the hierarchical sequence of the infos, as they occur in a specific procedure. Moreover, these modules only provide specific, defined infos that are used in the operational procedures of a system.

These difficulties also result when a Siemens Protocol Tester K 1195 is used in place of a net termination or a subscriber data terminal, as described in the *Siemens Telcom Report* 11 (1988) March–April, No. 2, pp 61 to 64, particularly from page 62, right column, last two paragraphs to page 64, first three paragraphs. In the case of the measurement described there, one does indeed measure at the $S_o$ interface, after the subscriber data terminal or the net termination has been disconnected from the data bus found in this area, and the Protocol Tester K1195 has been connected, and the area has also been activated by the infos. However, in doing this, only protocol measuring tasks are solved; there is no measurement in the physical plane.

Summary of the Invention

The present invention is directed toward the problem of developing a method for measuring how a component of a subscriber area of an Integrated Services Digital Network (ISDN) System reacts to selected data sequences. The method is applicable to an ISDN system that features a system connection with a standardized $S_o$ interface, at least one subscriber data terminal at least one subscriber data terminal. The measurement involves disconnecting the subscriber data terminal and/or the net termination from the data bus and connecting a test pattern generator for generating the data sequences used in the connection set-up in the area of the $S_o$ interface and a measuring device to the data bus.

The object of the invention is to develop such a method, so that one will be able to perform metrological check tests on the interfaces of the subscriber unit or of the net termination as well as on the data bus. The present invention solves this problem by using a test pattern generator, with which each individual data sequence used for the connection set-up can be produced for a desired duration.

According to the method of the invention, one can advantageously perform metrological check tests on the interfaces of the subscriber units or of the net termination, as well as on the data bus, without any restriction with regard to the duration, succession and the sequence of the data sequences (infos) output by the test pattern generator for measuring purposes. Thus, data sequences can be demanded as a response from the component to be tested and be displayed or evaluated by means of a measuring device. The device can consist, according to the German Post Office Guideline 1 TR3, of an oscilloscope or a frequency counter, whereby their duration is not restricted by the procedural regulations. This can be achieved by the continuous transmission of a data sequence (info), that is the on-going transmission of a data sequence, without this transmission being influenced or broken off by the data sequence (info) retransmitted as a response by the component to be tested. Moreover, the component to be tested can receive any order of data sequences, whereby the order of the data sequences is not predetermined by the hierarchy of the procedure peculiar to the interface.

Another advantageous development of the method according to the invention provides for using a test pattern generator which, in addition, is able to transmit a freely definable data sequence. Thus, there is the advantageous possibility of transmitting freely definable data sequences required for measuring purposes; in this manner, measurements can also be performed, where the data sequences (infos) established by the procedures peculiar to the interface cannot be applied as test patterns or are not sufficient.

A further development of the method according to the invention provides for using a test pattern generator that is able to transmit control and/or identification data, synchronously to the data sequences, on at least one data output channel. Thus it is possible, in an advantageous manner, to characterize certain information bits of a data sequence (info); for this purpose, identification data, for example in the form of "1" bits, are output via at least one data output channel at the same time as the specific information bits. Consequently, in the same manner, a whole section of a data sequence (info) can also be characterized. Furthermore, synchronization and control signals can be transmitted to the measuring device, when certain information bits of a data sequence appear.

A test pattern generator for implementing the method of the invention contains a memory, which is able to transmit at least the data sequences used for the connection set-up in the area of the $S_0$ interface individually for a desired duration; the test pattern generator has a control unit connected to the memory. With this control unit, one can select the respective individual data sequence, as desired.

On the input side, the control unit can advantageously receive the information by way of the data sequence to be selected and, on the output side, it is connected via a trigger element to address inputs of the memory; a data output of the memory is connected to the enable input of the trigger element. The control unit thereby receives on the input side, for example, the digital coding of the number of the desired data sequence. With this circuit configuration, it is possible to select data sequences of any sequence and duration. This is rendered possible because the control unit on the input side can receive any sequence of information and can receive this same information respectively for any length of time. If a freely definable data sequence is required for measuring purposes, then at least this one freely definable data sequence is likewise stored in the memory. A particularly well-suited, memory is one from which the selected data sequence can be read out sequentially. For this purpose, an address preselection (offset) is made with the control unit, whereby the address defined in this manner responds to the memory location containing the first data bit of a desired data sequence. The following memory locations are read out in a timed manner with a clocked, incremental counter module, until the address of the memory location containing the last data bit of the data sequence is reached. If the data sequence is supposed to be read out again, for example in the case of a continuous transmission of a data sequence, the counter is reset synchronously, and the readout operation begins again at the preselected (offset) address.

Another development of the test pattern generator for implementing the method according to the invention provides that an erasable and re-writable memory chip is made available as the memory. Thus, in an advantageous manner, it is possible to modify the data sequences used for measuring purposes and thus to adapt them to modified measuring tasks. Edited data sequences can be written in this chip relatively simply, by means of an appropriate computer program, whereby one can also rely on a computer-internal RAM memory; an EPROM chip is also suited for example as a memory chip.

DETAILED DESCRIPTION

Figure 1:
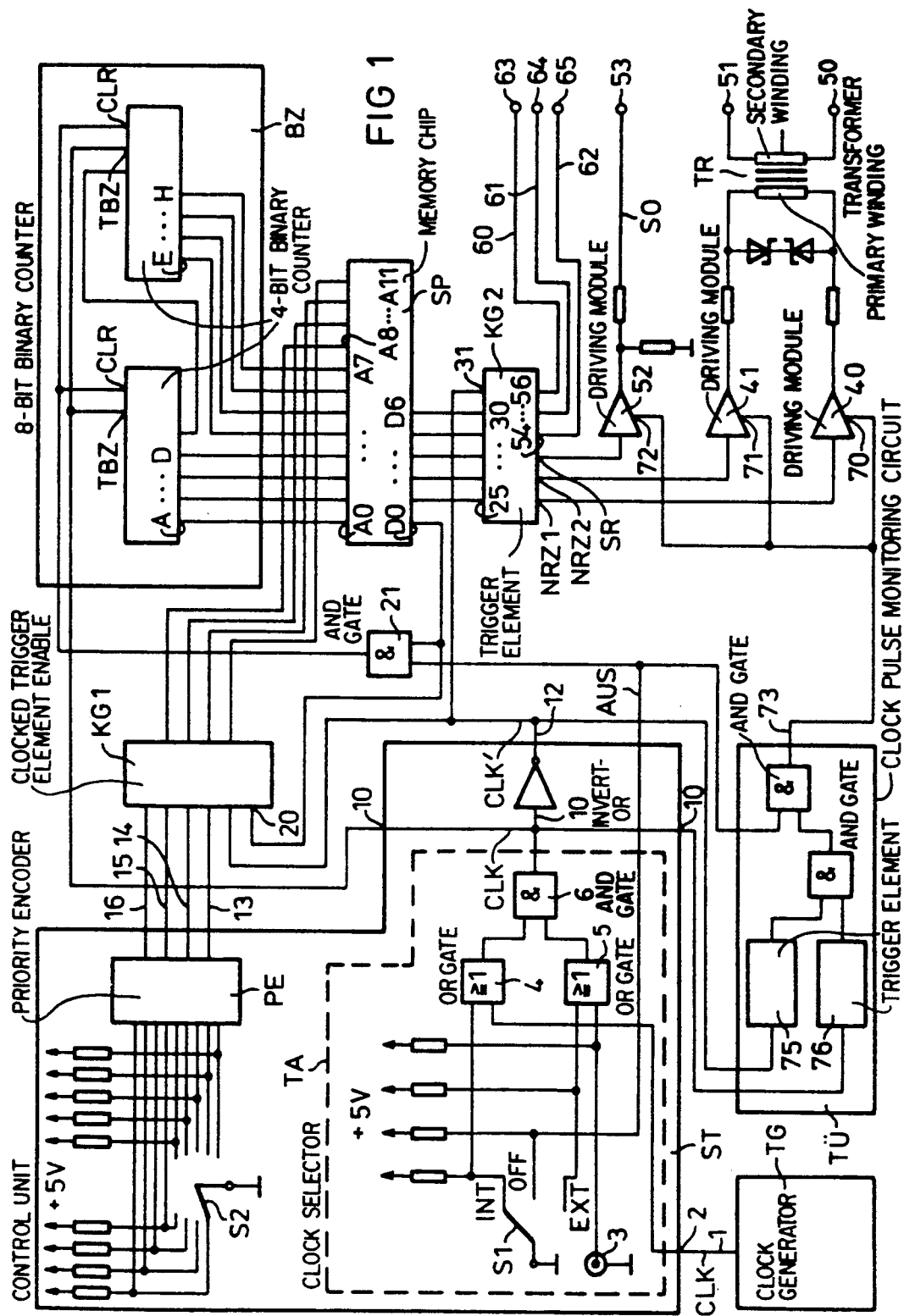
FIG. 1 illustrates a circuit diagram of a test pattern generator for implementing the method according to the invention.

According to FIG. 1, a test pattern generator contains a clock generator TG, whose clock pulses CLK are supplied via a line 1 to a terminal connection 2 of a control unit ST. The control unit ST contains a clock selector TA, that features another terminal connection 3, to which an external clock generator (not depicted) can be connected to. The terminal connection 2 of the control unit ST is formed as one input of a logic OR gate 4, and the terminal connection 3 of the control unit ST is formed as a terminal connection of another logic OR gate 5. One additional input each of the logic OR gate 4 or 5 is connected respectively to an INT or EXT terminal connection assigned to a switch position, internally or externally of a switch S1. The switch S1 has a third switch position, which is assigned to the OFF terminal connection. The outputs of the logic OR gates 4 and 5 lead to the inputs of an AND gate 6, whose output forms a clock output 10 of the clock selector TA. The inverted clock pulse CLK' can be picked off at an output 12 of the clock selector TA. The control unit ST contains a second switch S2 and a downstream priority encoder PE, whose inputs, in accordance with the position of the switch S2, are loaded with 0 or +5 V, and whose outputs form outputs 13 to 16 of the control unit ST. The outputs 13 to 16 lead via a first clocked trigger element KG1 to address inputs A8 to A11 of a memory chip SP. A data output DO of the memory chip SP leads to an enable input 20 of the clocked trigger element KG1. Address inputs A0 to A7 of the memory chip SP are connected to outputs A to H of an 8-bit binary counter BZ. This 8-bit binary counter is assembled from two cascading 4-bit binary counters, that are each provided with a synchronous reset input CLR. At its clock input TBZ, the binary counter BZ receives the clock pulse CLK. The reset inputs CLR are connected via an AND gate 21 to the data output DO of the memory chip SP and to the OFF terminal connection of the switch S1. Data outputs D1 to D6 of the memory chip SP lead to inputs 25 to 30 of a second trigger element KG2. A clock input 31 of the trigger element KG2 is connected to the output 12 of the control input ST and thus receives the inverted clock signal CLK'. The outputs NRZ1 and NRZ2 of the trigger element KG2 lead via two driving modules 40 and 41 to connections of a primary winding of a transformer TR. The secondary winding of the transformer TR has two terminal connecting points 50 and 51, which at the same time represent output points of the test pattern generator, to which output points is connected the data bus to be tested with two inputs. Another output SR of the trigger element KG2 leads via another driving module 52 to a circuit point 53 of a data output channel SO. This circuit point 53 also forms an output point of the test pattern generator. Three more outputs 54, 55 and 56 of the trigger element KG2 lead. via data output channels 60, 61 and 62 to additional output-side terminal connections 63, 64 and 65 of the test pattern generator. The driving modules 40, 41 and 52 are provided with enable inputs 70, 71 and 72, that are connected to an output 73 of a clock-pulse monitoring circuit TU. This clock-pulse monitoring circuit contains two monostable, re-triggerable trigger elements 75 and 76, that receive the clock pulse CLK or the inverted clock pulse CLK' on the input side.

Figure 2:
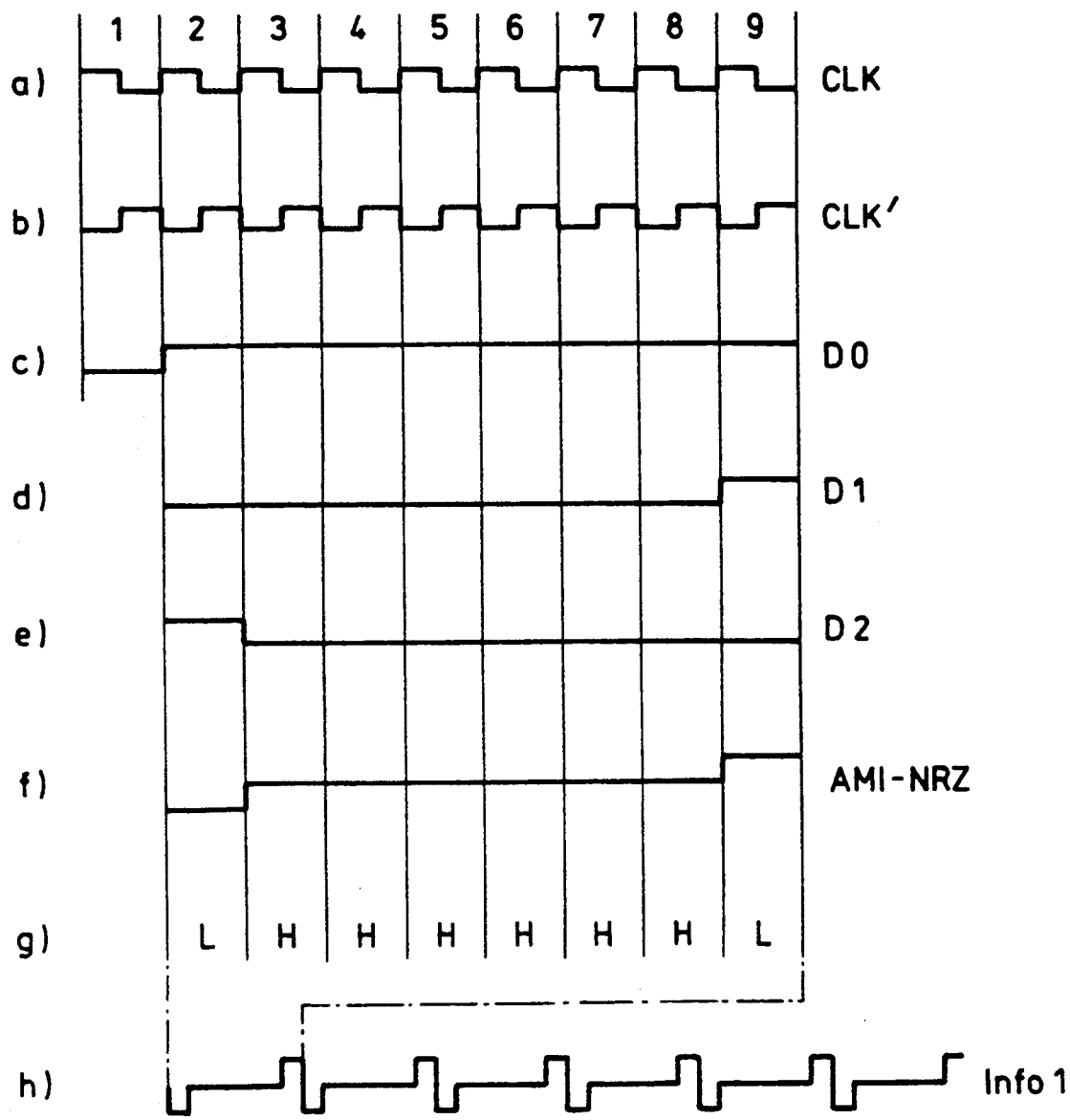
FIG. 2 illustrates the signal sequences occurring at significant points of the circuit arrangement during operation of the test pattern generator according to FIG. 1.

The functioning method of the test pattern generator shall be explained in greater detail in connection with the signals depicted in FIG. 2 at significant points of the circuitry according to FIG. 1. Thereby, the, clock pulse CLK applied to the output 10 of the clock selector TA is depicted in line a, and the inverted clock pulse CLK' that can be picked off at the output 12 of the control unit ST is depicted in line b. Line c shows the time characteristic of the signals output on the data output DO of the memory chip SP; lines d and e show the pattern of the signals at the data outputs D1 or D2 of the memory chip SP or of the outputs NRZ1 and NRZ2 of the trigger element KG2. The output signal that can be picked off according to the transformer TR at the terminal connecting points 50 and 51 of the test pattern generator is depicted in line f. In line g, the bit sequence read out in this example from the memory chip SP is plotted in the form of the individual logic states, which consist of 8 bits. A complete data sequence (for example info 1) consists of 48 bits, in the example of info 1, it consists of a six-time repetition of the bit sequence depicted in line g. To provide a better overall view, the pattern of the entire data sequence (info 1) is depicted in line h. If the switch S1 (FIG. 1) of the clock selection TA is placed in the position INT, the test pattern generator is then supplied with the clock pulse CLK or with the inverted clock pulse CLK' generated by the clock generator TG. These clock pulses are available at the outputs 10 or 12 of the control unit ST. The data sequence (for example info 1) to be output is selected with the switch S2; by way of the priority encoder PE and the trigger element KG1, the address inputs A8 to A11 of the memory chip SP receive a bit pattern corresponding to the selected data sequence (for example info 1). Thus the first memory location to be read out is defined. In line c (FIG. 2), with the termination of a first clock pulse 1, one recognizes the end of a reset signal for the 8-bit binary counter module BZ that is output from the data output DO of the memory chip SO. With the first clock pulse, the first memory location of the memory chip SP and thus the first bit of the data sequence (info 1) is read out. During the second clock pulse, a positive pulse occurs at the data output D2 (line e, FIG. 2), however, no pulse is recognizable at the data output D1. During the following six clock pulses (3 to 8) no pulse is recognizable at either the data output D1 or at the data output D2. During the ninth clock pulse, a positive pulse appears on the data output D1 (line d, FIG. 2). The signals occurring at the outputs NRZ1 or NRZ2 of the trigger element KG2 corresponding to the signals of the data outputs D1 and D2 applied to the inputs 25 and 26 are supplied via the driving modules 40 or 41 to the transformer TR; on the output side, the output signal represented in the AMI-NRZ modified code can be picked off at the connections 50 and 51. Thus in the selected example, the bit sequence depicted in line f is read out, which bit sequence in turn represents a portion of a data sequence to be read out (in this example, info 1). Such a data sequence consists altogether of 48 bits, so that analogously in the example at hand, there would be an additional 40 bits to be read out of the memory chip SP. When the last bit of a data sequence (bit 48) to be read out is reached, a pulse is output on the data output DO (compare first clock pulse, line c, FIG. 2). The pulse is used for the synchronized resetting of the binary counter BZ and to transfer the bit pattern applied on the input side to the trigger element KG1, by means of the position of the switch S2, to the address inputs AB to A11 of the memory chip SP. If the continuous transmission of a data sequence is desired, the switch S2 of the control unit ST remains in an unchanged position; in this manner begins the reading out of the same memory area. If, in the interim, the position of the switch S2 has changed, then the bit structure corresponding to the new switch position is present along with the clock pulse at the output of the trigger element KG1 and thus is transmitted to the address preselection inputs A8 to A11 of the memory chip SP, in which the already mentioned enabling pulse is transmitted via the data output DO of the memory chip SP to the enabling input 20 of the trigger element KG1. In this manner, it is assured, that at any time a new data sequence (info) to be read can be determined with the switch S2, and the data sequence read out at the moment is read out to the end without being affected. The data output at the data output D3 of the memory chip SP lead via the trigger element KG2 (output SR) and the driving module 52 to the terminal connecting point 53 of the data output channel SO and serve as a $S_o$ framing pulse to identify a specific location of a data sequence. This framing pulse is namely output at the beginning of a transmission frame and makes it possible to recognize a defined frame beginning during the measurements. During each clock pulse, additional data can be read out of the memory chip SO. These data can be picked off at the data outputs D4, D5 and D6, and they are supplied via the trigger element KG2 to the data output channels 60, 61 and 62. Additional functions, for example controlling the measuring hardware, identifying specific information bits or sections of a data sequence, can be fulfilled with these data.

In the same manner, freely defined data sequences can be read out of the memory chip SP. These can be data sequences that are identical to the procedural data sequences peculiar to the interface, right down to the code violations characterizing the frame beginning. For specific measuring purposes, one can change over with the switch S1 to an external clock pulse source, that can be connected to the terminal connection 3 of the control unit ST. The switch S1 is also used to switch off the test pattern generator, whereby the 8-bit binary counter BZ is then reset. If the clock pulse (internal or external) fails, then one of the two monostable trigger elements 75 or 76 of the clock-pulse monitoring device TU is no longer triggered, and the clock-pulse monitoring TU device applies a signal to the enable inputs 70, 71 and 72 of the driving modules 40, 41 and 52 that causes the driving modules 40, 41 and 52 to go over to the highly resistive state.

I claim:

1. A method for measuring a response from a component of a subscriber area of an Integrated Services Digital Network (ISDN) System to a plurality of selected data sequences, wherein the ISDN-system features a system connection with a standardized $S_o$ interface, at least one subscriber data terminal with a standard $S_o$ interface and a data bus for a two-way exchange of data sequences between a net termination and a minimum of one subscriber data terminal, said method comprising the steps of:
    a) disconnecting the subscriber data terminal and/or the net termination from the data bus;
    b) coupling a measuring device to the data bus; and
    c) coupling a test pattern generator for generating a plurality of data sequences used in a connection set-up in the subscriber area of the $S_o$ interface to the data bus, wherein the test pattern generator generates each individual data sequence used for the connection set-up for a duration based on measurement considerations relating to the measuring of the response and in a sequence of the data sequences based on measurement considerations relating to the measuring of the response, and wherein the measuring device measures the response of the component to the plurality of data sequences.

2. The method according to claim 1, further comprising the step of transmitting at least one freely definable data sequence by the test pattern generator.

3. The method according to claim 1, further comprising the step of transmitting a control and/or identification data, synchronously to the plurality of data sequences, on at least one data output channel.

4. A test pattern generator for use in measuring a response from a component of a subscriber area of an Integrated Services Digital Network (ISDN) System to a plurality of selected data sequences, wherein the ISDN-system features a system connection with a standardized $S_o$ interface, at least one subscriber data terminal with a standardized $S_o$ interface and a data bus for a two-way exchange of data sequences between a net termination and a minimum of one subscriber data terminal, said test pattern generator being coupled to the data bus when the subscriber data terminal and/or the net termination are disconnected from the data bus and a measuring device is coupled to the data bus and measures the response of the component to the plurality of selected data sequences, generating a plurality of data sequences used in a connection set-up in the subscriber area of the $S_o$ interface to the data bus, and generating each individual data sequence used for the connection set-up for a duration based on measurement consideration relating to the measuring of the response and in a sequence of the data sequences based on measurement considerations relating to the measuring of the response, said test pattern generator comprising:
    a) a memory transmitting the plurality of data sequences used for the connection set-up in the area of the $S_o$ interface individually for a desired duration; and
    b) a control unit connected to the memory controlling a selection of a desired individual data sequence.

5. The test pattern generator according to claim 4, further comprising a trigger element having an enable input, wherein the control unit further comprises an input receiving information by way of a selected data sequence and an output coupled to the trigger element, and the memory further comprises a plurality of address inputs coupled to the trigger element and a data output coupled to the enable input.

6. The test pattern generator according to claim 4, wherein said memory further comprises an erasable and re-writable memory chip.

7. The test pattern generator according to claim 5, wherein said memory further comprises an erasable and re-writable memory chip.

* * * * *